United States Patent
Wang et al.

[11] Patent Number: 6,142,493
[45] Date of Patent: Nov. 7, 2000

[54] SIDE-SLOPING STEERING DEVICE FOR A SKATEBOARD

[76] Inventors: Leao Wang; Peter Wu, both of No 1, Lane 233, Sec. 2, Charng Long Rd., Taiping, 411, Taiwan

[21] Appl. No.: 09/517,335

[22] Filed: Mar. 2, 2000

[51] Int. Cl.$^7$ .................................................. B62K 21/02
[52] U.S. Cl. ................................ 280/87.041; 280/11.23; 280/87.03; 280/267
[58] Field of Search ........................ 280/87.041, 11.22, 280/11.23, 267, 87.01, 87.021, 87.03

[56] References Cited

U.S. PATENT DOCUMENTS

| | | | |
|---|---|---|---|
| 1,707,831 | 4/1929 | Wagerski | 280/87.041 |
| 4,394,029 | 7/1983 | Holmgron | 280/87.041 |
| 4,552,372 | 11/1985 | Jones | 280/87.041 |
| 4,775,162 | 10/1988 | Chao | 280/87.041 |
| 5,039,121 | 8/1991 | Holter | 280/87.041 |

Primary Examiner—Richard M. Camby

[57] ABSTRACT

The present invention is related to a side-sloping steering device for a skateboard primarily comprising a front supporting bar and a height-adjustable handle in cooperation with an adjusting knob being inserted into the top of the front supporting bar. The front supporting bar is attached to a main frame, and the main frame and a locating member are pivoted together. Thereafter, when the front supporting bar is turned by the handle to the right and the left direction, the main frame being made in a sloping state. Then, a coupled lever of a wheel-connecting member is moved by a frame-shaped piece pivoted at bottom end of the main frame, wherein the upper end of the wheel-connecting member and the locating member are hinged together while the lower end thereof is provided with one wheel so that, when the coupled lever is turned and moved, the wheel-connecting member will also be turned so that the expected goal of turning the wheels can be reached.

2 Claims, 10 Drawing Sheets

SIDE-SLOPING STEERING DEVICE FOR A SKATEBOARD

BACKGROUND OF THE INVENTION

1. Field of the Invention

The present invention relates to a side-sloping steering device for a skateboard, and more particularly to a device which makes use of the sloping of the main frame to reach the direction-turning effect of the wheels.

2. Description of the Prior Art

The steering device of a broadly used conventional skateboard, as shown in FIG. 11, is structurally the same to that of bicycles or cars, that is, they make use of turning the handle or the steering wheel to enable the coupled wheel assembly to carry out a direct direction-turning movement. Though this is a very common technique, it's uneasy to hold the handgrip 10 with one hand in turning the direction, especially for the beginner or the user unfamiliar therewith, because it is an exercise apparatus (or called toy) with small volume. An excessive or insufficient turning movement is easily caused.

SUMMARY OF THE INVENTION

It is a main object of the present invention to provide a side-sloping steering device for a skateboard which makes use of the right or left shift of the steering handle or the center of body gravity of the users to reach a simultaneous sidesloping effect so that the wheels can be easily turned.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
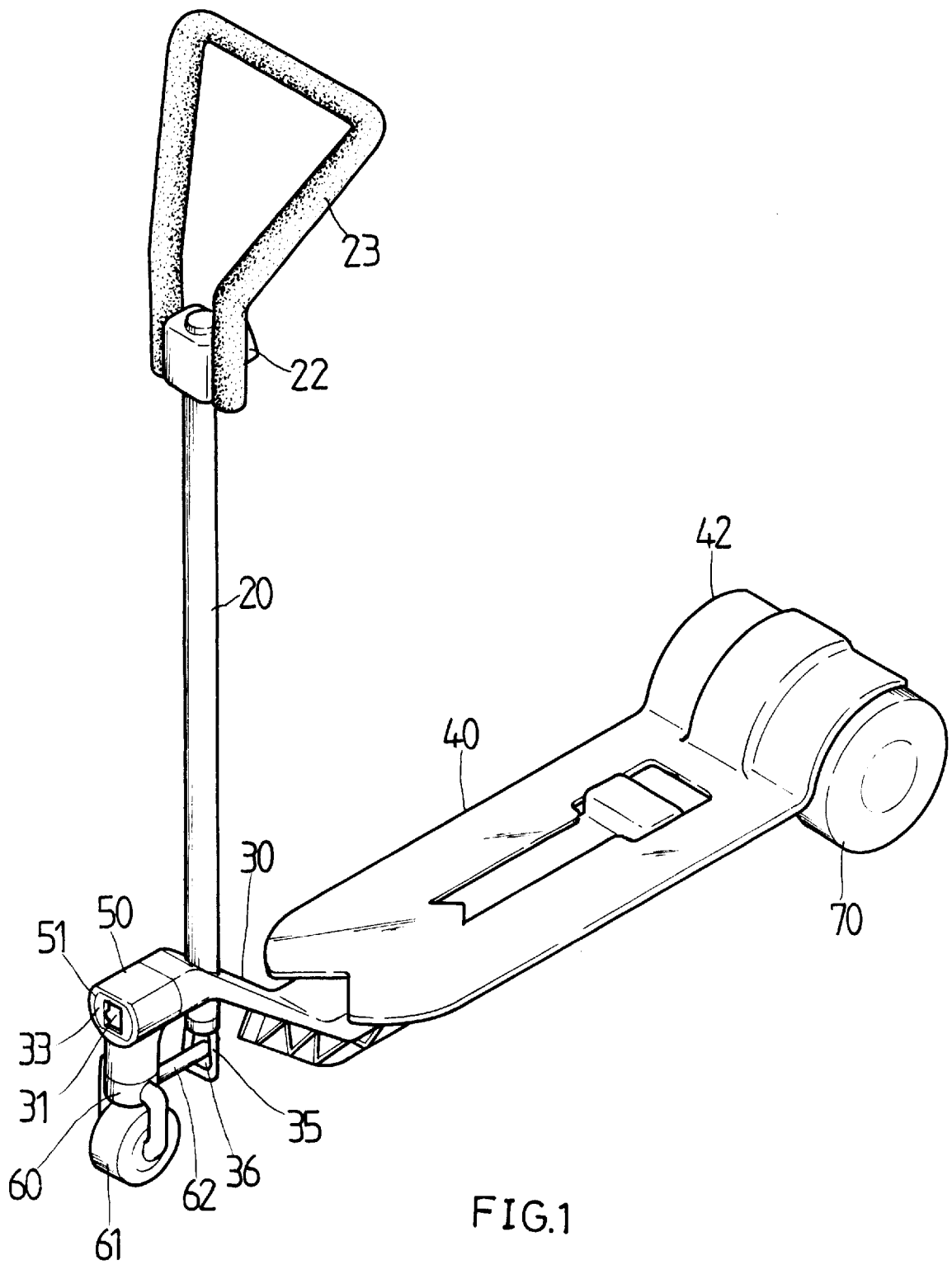
FIG. 1 is a perspective assembly view of a preferred embodiment of the present invention.
Figure 2:
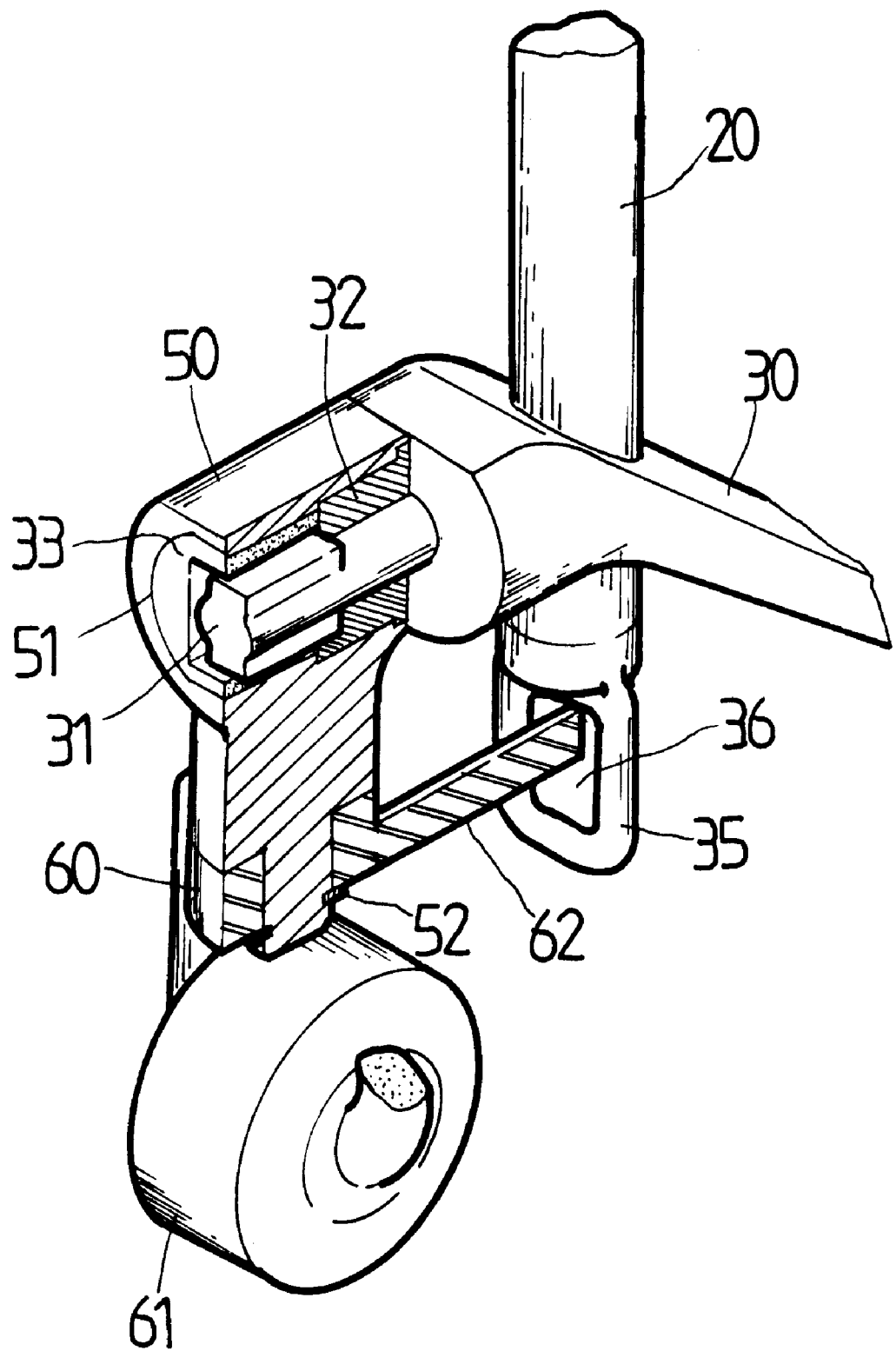
FIG. 2 is a partial cutaway view of a steering device in accordance with FIG. 1.
Figure 3:
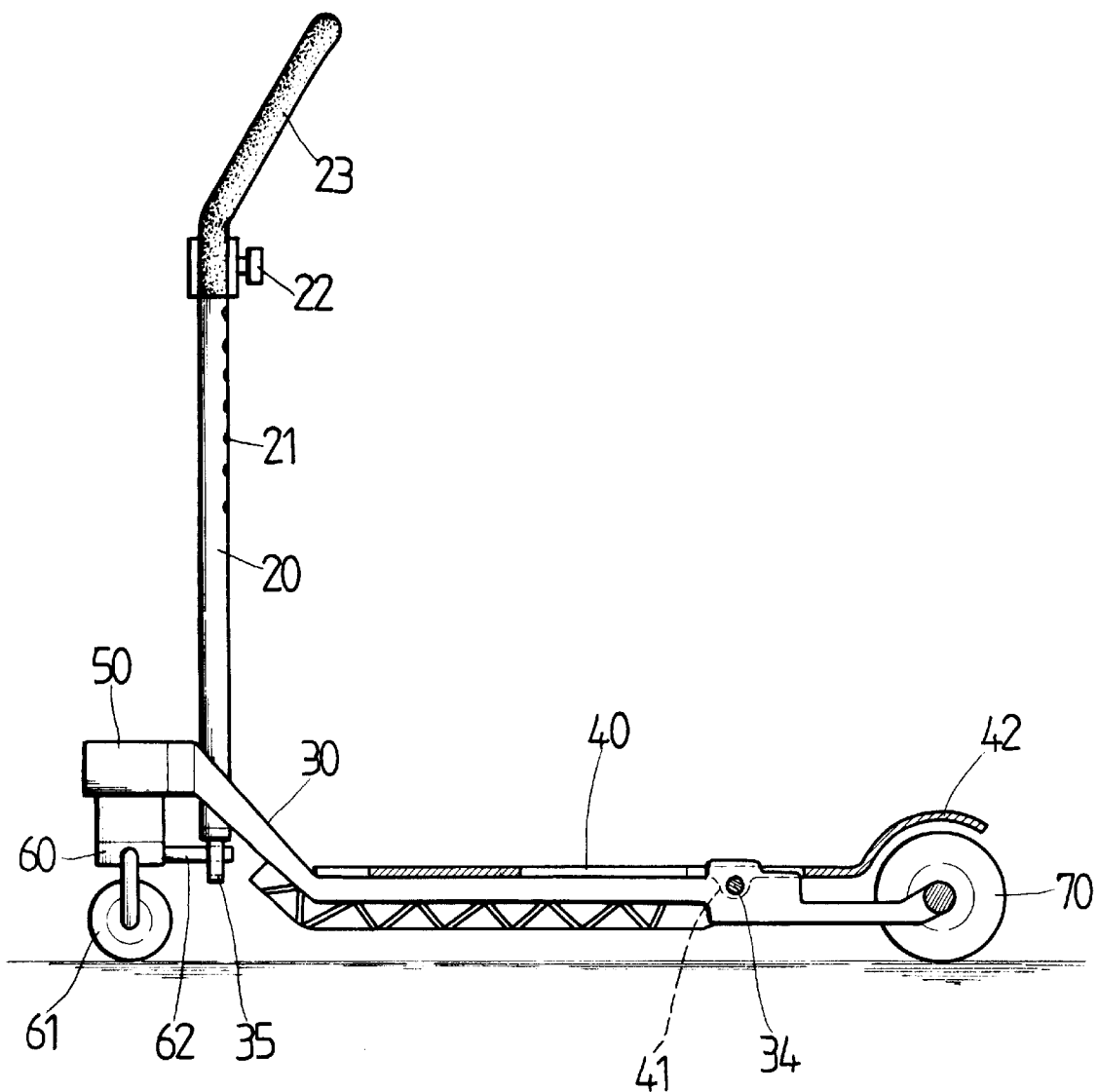
FIG. 3 is a side view and a partial cutaway view of the skateboard in accordance with FIG. 1.

First of all, referring to FIG. 1, 2 and 3, they show a preferred embodiment of the present invention which includes the following basic components:

a front supporting bar 20 having a plurality of through holes 21 for fastening a handle 23 and adjusting the height thereof in cooperation with a knob 22, a main frame 30 being coupled at the bottom end thereof;

a main frame 30 having a pivot 31 at front end thereof, a locating member 50 being hinged on said pivot 31 in cooperation with a sleeve 32 and a soft packing ring 33, said main frame 30 and a deck 40 being hinged by means of a through shaft 34 at a certain position, a frame-shaped piece 35 being connected at bottom end of said supporting bar 20;

a deck 40 placed upon said main frame 30 and hinged with said main frame 30 by means of an ear 41, a tail 42 being raised and covering the top of said rear wheels 70, a proper clearance being kept between said tail 42 and said rear wheels 70;

a locating member 50 having an axial through hole 51 at the top thereof for holding a sleeve 32 and a soft packing ring 33 so that said locating member 50 and said pivot 31 of said frame 30 being joined together;

a wheel-connecting member 60 connecting a front wheel 61 at the lower end thereof, having a coupled lever 62 at the side thereof in the direction of said frame 30, said coupled lever 62 extending into a hole of said frame-shaped piece 35; and two rear wheels 70.

After assembly of the foregoing components, when the front supporting bar 20 is turned by the handle 23 to the right and the left direction, the main frame 30 will also be made in a sloping state. Thereafter, the coupled lever 62 of the wheel-connecting member 60 is moved by the frame-shaped piece 35 pivoted at bottom end of the main frame 30, wherein the upper end of the wheel-connecting member 60 and the locating member 50 are hinged together while the lower end thereof is provided with one front wheel 61. Thus, when the coupled lever 62 is turned and moved, the wheel-connecting member 60 will also be turned so that the expected goal of turning the front wheels 61 can be reached.

Of course, the user can make use of leaning the center of body gravity on the deck 40 to reach the goal of turning direction.

The soft packing ring 33 plugged within the through hole 51 of the locating member 50 is used to enable the pivot 31 to return to the original position automatically by means of the resilient force when the pivot 31 of the main frame 30 is turned and pressed.

Figure 4:
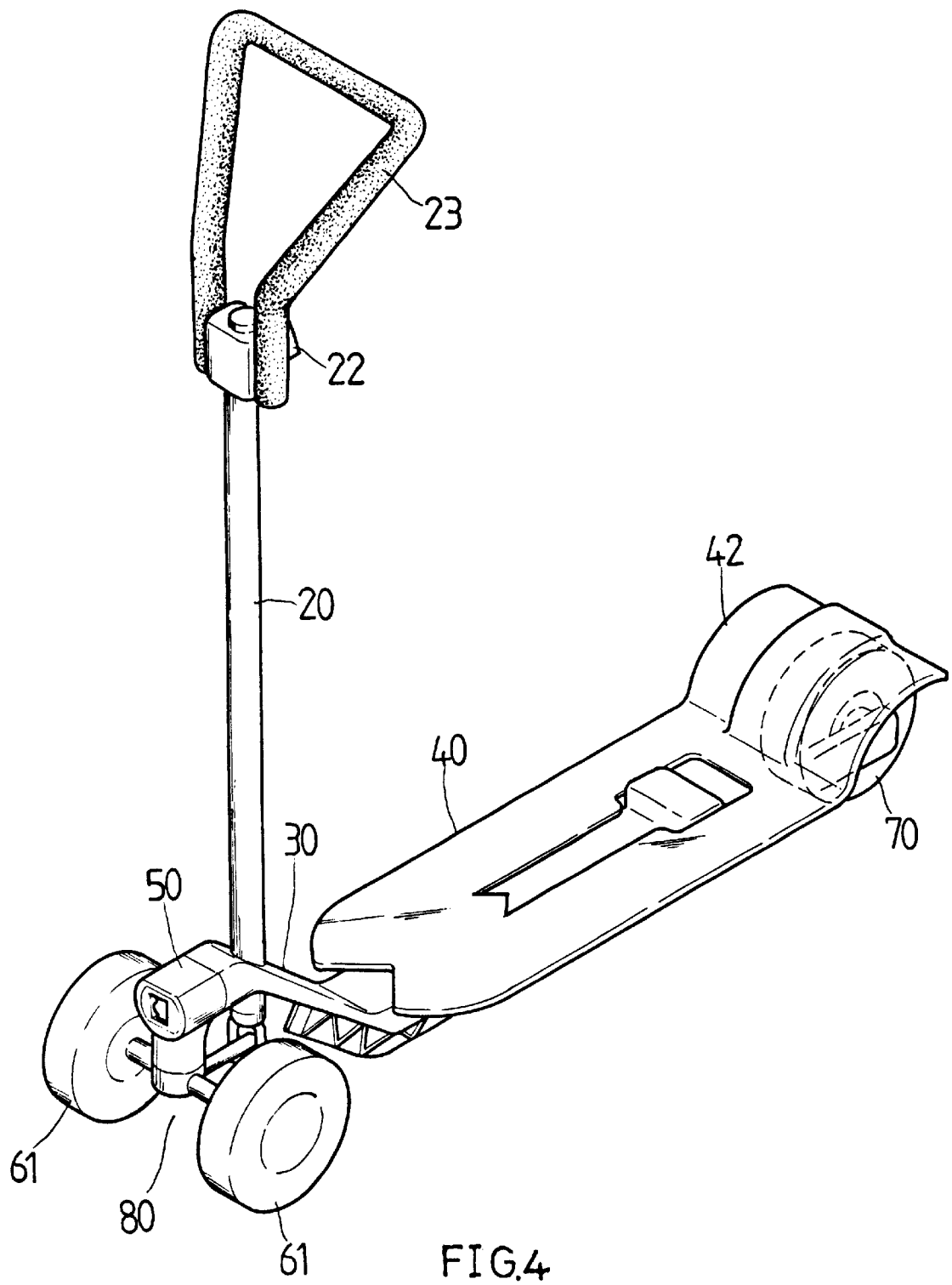
FIG. 4 is a perspective view of another preferred embodiment of the present invention.

In another preferred embodiment, as shown in FIG. 4, two front wheels 61 can be provided in cooperation one rear wheel 70 while the steering device 80 is disposed at the position of the front wheels 61.

Broadly speaking, the foregoing steering device comprises the main frame 30, the frame-shaped piece 35, the pivot 31, the sleeve 32, the soft packing ring 33, the deck 40, the locating member 50 and the wheel-connecting member 60.

Figure 5:
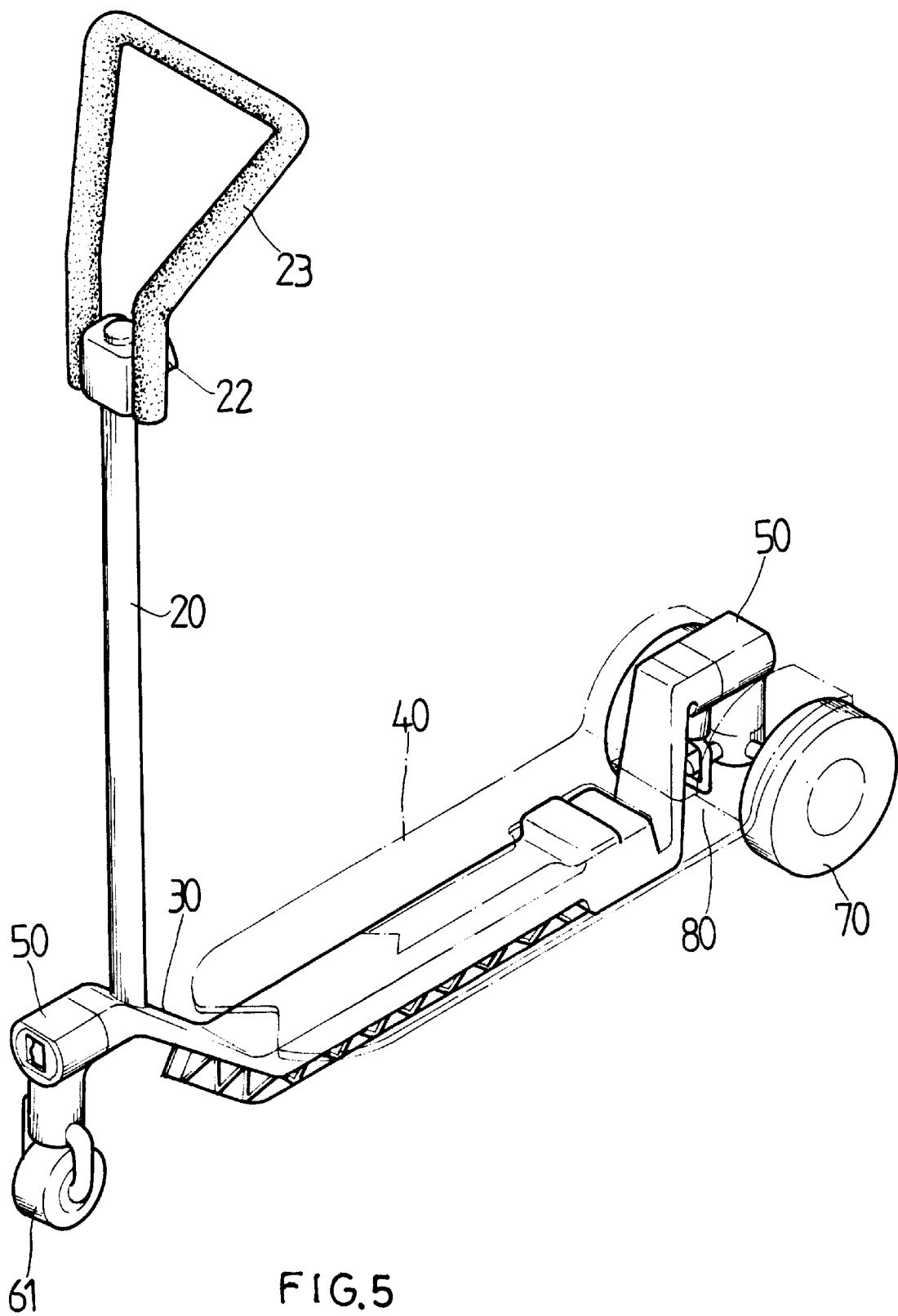
FIG. 5 is a perspective view of a further preferred embodiment of the present invention.
Figure 6:
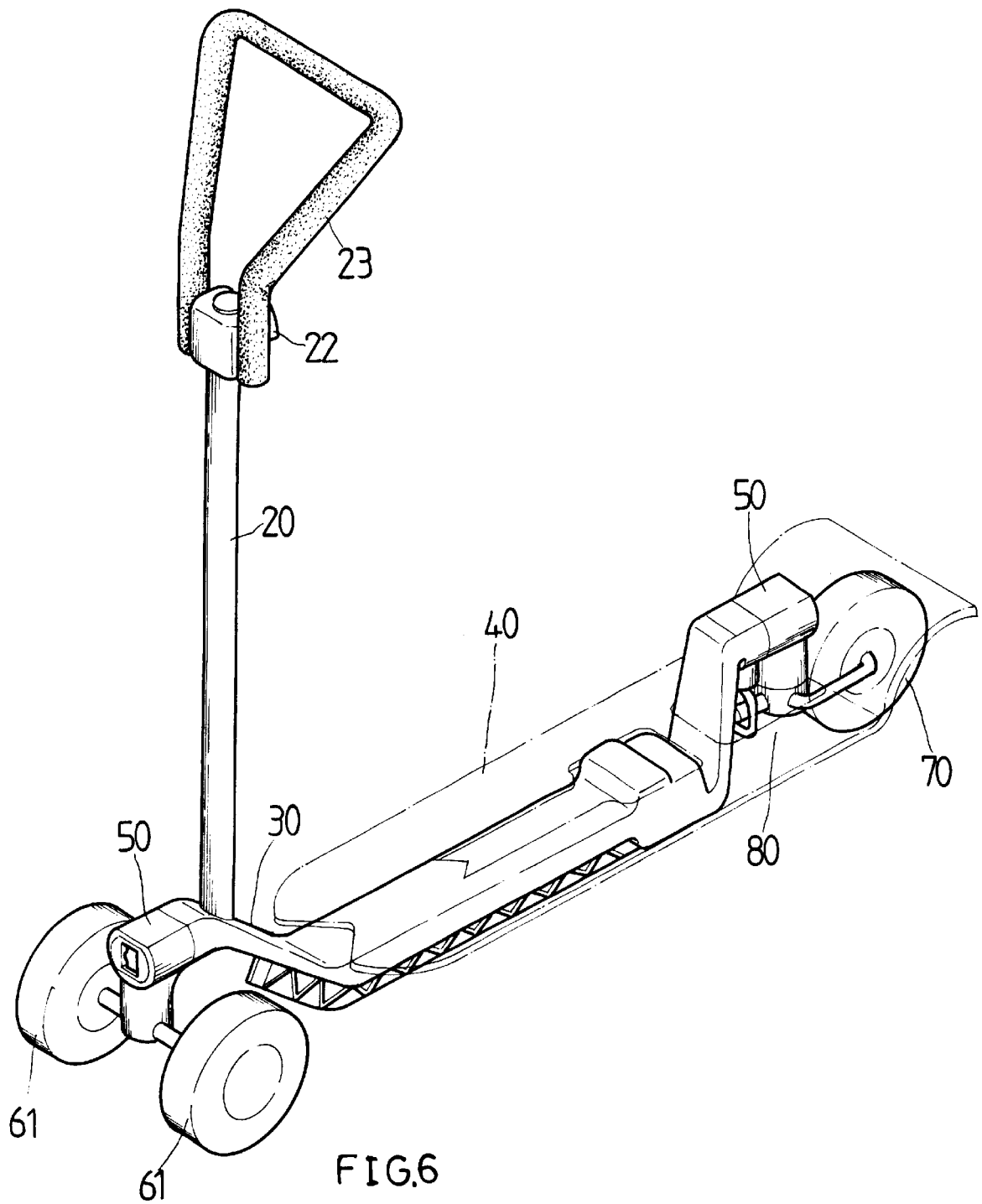
FIG. 6 is a perspective view of still another preferred embodiment of the present invention.
Figure 7:
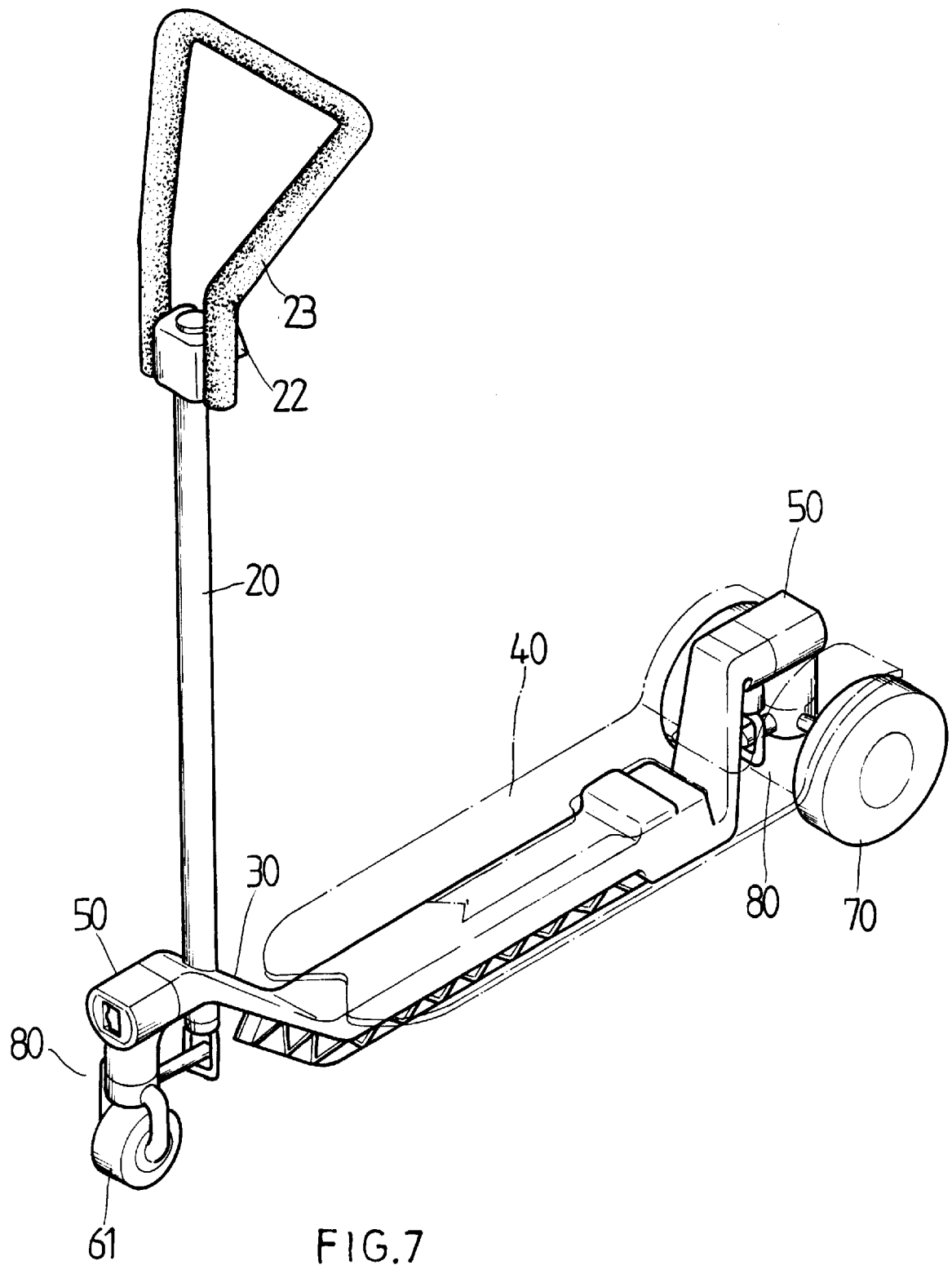
FIG. 7 is a perspective view of still a further preferred embodiment of the present invention.
Figure 8:
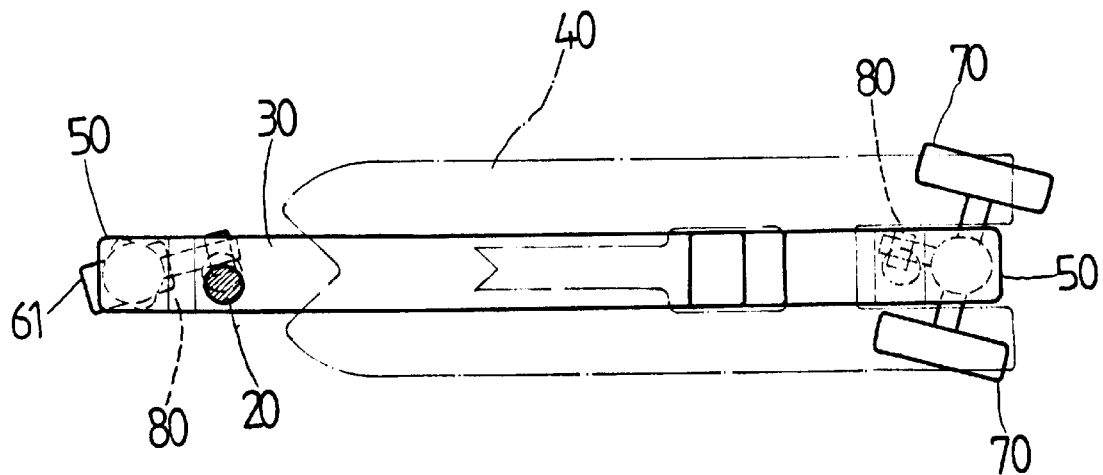
FIG. 8 is a schematic action drawing of the preferred embodiment in accordance with FIG. 7.
Figure 10:
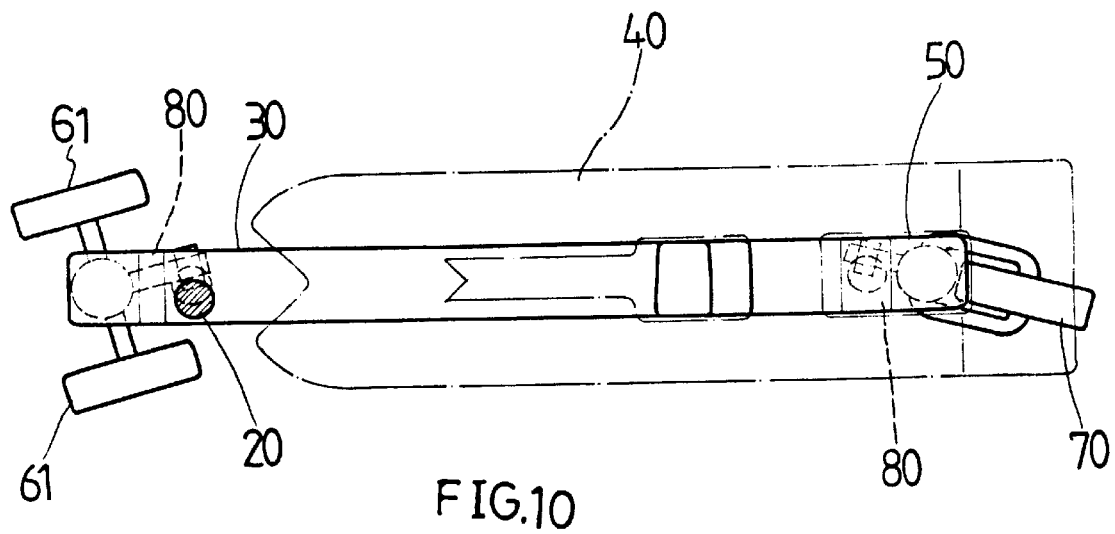
FIG. 10 is a schematic action drawing of the preferred embodiment in accordance with FIG. 9.
Figure 9:
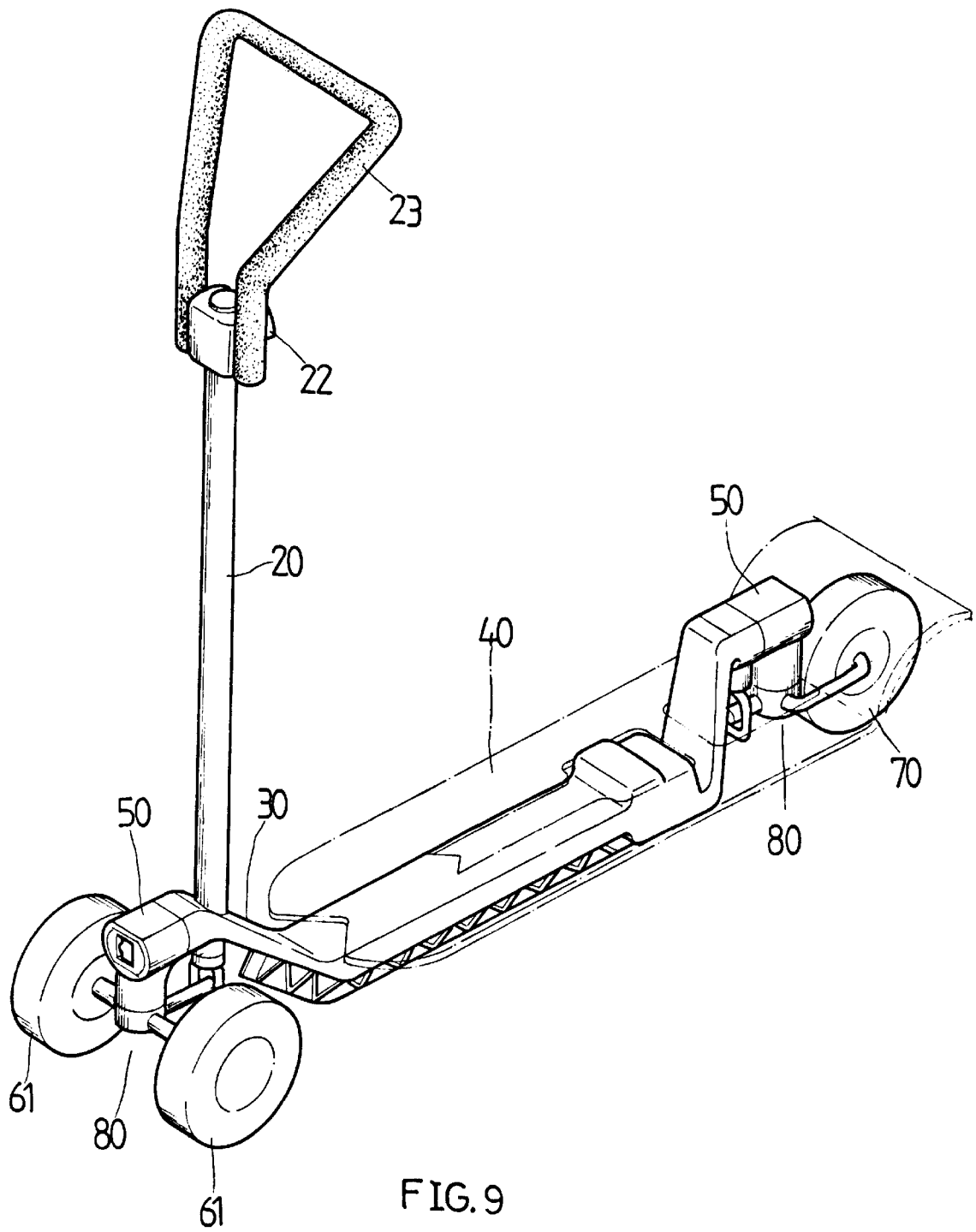
FIG. 9 is a perspective view of yet another preferred embodiment of the present invention.
Figure 11:
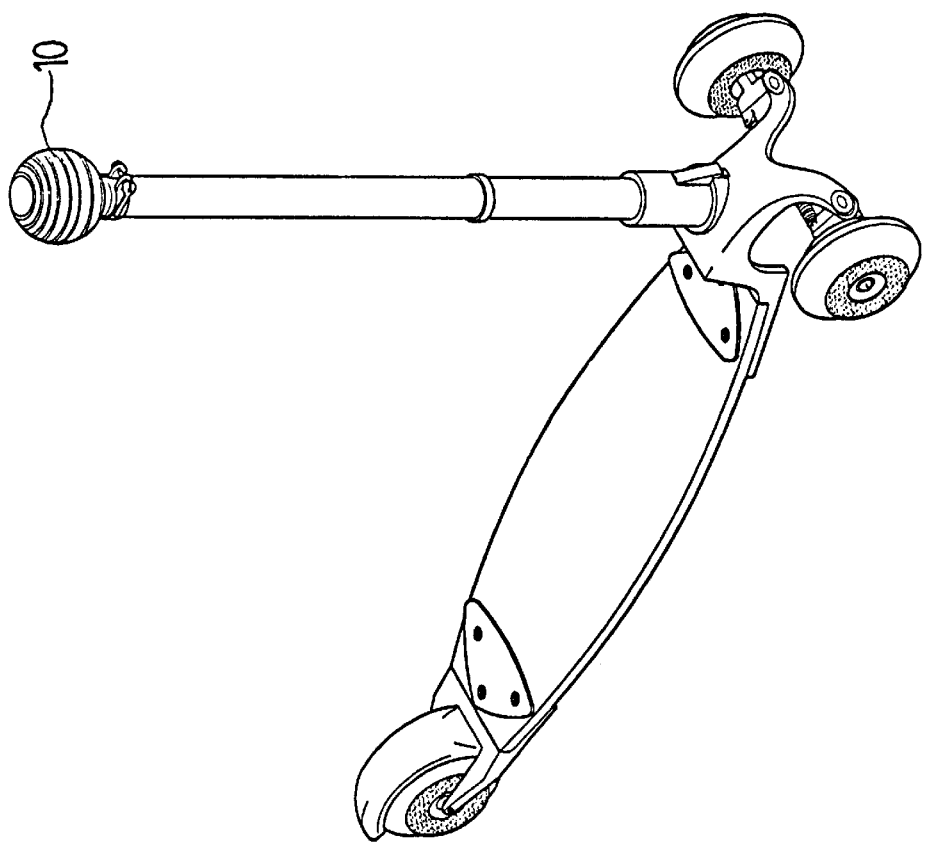
FIG. 11 is a perspective view of a conventional skateboard.

Furthermore, the steering device 80, as shown in FIG. 5 and 6, can be mounted at the position of the rear wheels 70. No matter one front wheel 61 is in cooperation with two rear wheels 70 or two front wheels 61 are in cooperation with one rear wheel 70 is applicable.

Finally, the steering device 80, as shown in FIG. 7, 8, 9 and 10, can be respectively mounted at the position of the front and rear wheels 61, 70 so that the radius of gyration can be reduced and the turning speed can be increased when the front and rear wheels 61, 70 will simultaneously turn in the corresponding direction.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A side-sloping steering device for a skateboard primarily comprising a front supporting bar, a height-adjustable handle in cooperation with an adjusting knob being inserted into the top of said front supporting bar, said front supporting bar being attached to a main frame, said main frame and a locating member being pivoted together; thereafter, when said front supporting bar being turned by said handle to the right and the left direction, said main frame being made in a sloping state; furthermore, a coupled lever of a wheel-connecting member being moved by a frame-shaped piece pivoted at bottom end of said main frame, wherein the upper end of said wheel-connecting member and said locating member are hinged together while the lower end thereof is provided with one wheel so that, when said coupled lever is turned and moved, said wheel-connecting member will also be turned so that the expected goal of turning said wheels can be reached.

2. A side-sloping steering device for a skateboard primarily comprising a front supporting bar, a height-adjustable handle in cooperation with an adjusting knob being inserted into the top of said front supporting bar, said front supporting bar being attached to a main frame, said main frame and a locating member being pivoted together; thereafter, when said front supporting bar being turned by said handle to the right and the left direction, said main frame being made in a sloping state; furthermore, a respective coupled lever of a wheel-connecting member being moved by a frame-shaped piece pivoted at two sides of the bottom end of the main frame, wherein the upper end of said wheel-connecting member and said locating member are hinged together while the lower end thereof is provided with one wheel so that, when said coupled lever is turned and moved, two said wheel-connecting members will also be turned so that the expected goal of turning said front and rear wheels can be reached.

* * * * *